(12) United States Patent
Mezzera

(10) Patent No.: US 9,289,070 B2
(45) Date of Patent: Mar. 22, 2016

(54) CHAIR HAVING A DYNAMICALLY-FLEXIBLE BACK AND SEAT

(71) Applicant: Marcelo Mezzera, Rancho Santa Margarita, CA (US)

(72) Inventor: Marcelo Mezzera, Rancho Santa Margarita, CA (US)

( * ) Notice: Subject to any disclaimer, the term of this patent is extended or adjusted under 35 U.S.C. 154(b) by 0 days.

(21) Appl. No.: 14/632,384

(22) Filed: Feb. 26, 2015

(65) Prior Publication Data

US 2015/0164232 A1 Jun. 18, 2015

Related U.S. Application Data

(63) Continuation-in-part of application No. 13/624,114, filed on Sep. 21, 2012.

(51) Int. Cl.

| B60N 2/66 | (2006.01) |
|---|---|
| A47C 7/46 | (2006.01) |
| A47C 7/44 | (2006.01) |
| A47C 7/38 | (2006.01) |
| B60N 2/62 | (2006.01) |

(52) U.S. Cl.
CPC ... *A47C 7/46* (2013.01); *A47C 7/38* (2013.01); *A47C 7/44* (2013.01); *B60N 2/62* (2013.01); *B60N 2/66* (2013.01)

(58) Field of Classification Search
CPC ............... B60N 2/66; B60N 2/62; A47C 7/38
USPC ............ 297/216.12, 391, 284.4, 284.11, 123, 297/284.1, 284.7
See application file for complete search history.

(56) References Cited

U.S. PATENT DOCUMENTS

| 3,730,589 | A | * | 5/1973 | Lane | ......................... A61G 5/12 297/284.5 |
| 4,161,337 | A | * | 7/1979 | Ross | ...................... A47C 7/405 297/230.12 |
| 5,567,011 | A | * | 10/1996 | Sessini | ........................ 297/284.7 |
| 8,408,647 | B2 | * | 4/2013 | Wu | ............................... 297/285 |
| 2002/0093233 | A1 | * | 7/2002 | Chu | ........................... 297/284.4 |

* cited by examiner

*Primary Examiner* — Syed A Islam
(74) *Attorney, Agent, or Firm* — Morland C. Fischer

(57) ABSTRACT

A chair including a dynamically-flexible back and seat having a shape that adjusts to the movements of a user seated in the chair to enhance user comfort. Each of the back and seat has an air gap formed therewithin and a resilient frame or liner with a spring memory. The resilient liner is adapted to flex in response to compressive forces that are generated as the user slides his body back or from side-to-side in the chair. Accordingly, some of the chair back and some of the chair seat move into respective air gaps so that the shapes of the back and seat change to conform to the movements of the user. The air gaps also establish air flow ventilation channels which run laterally through the back and seat of the chair. In one case, a lumbar portion is rotatable back and forth around a vertical pivot axis so as to pivot towards one side of the chair back or the other side.

4 Claims, 5 Drawing Sheets

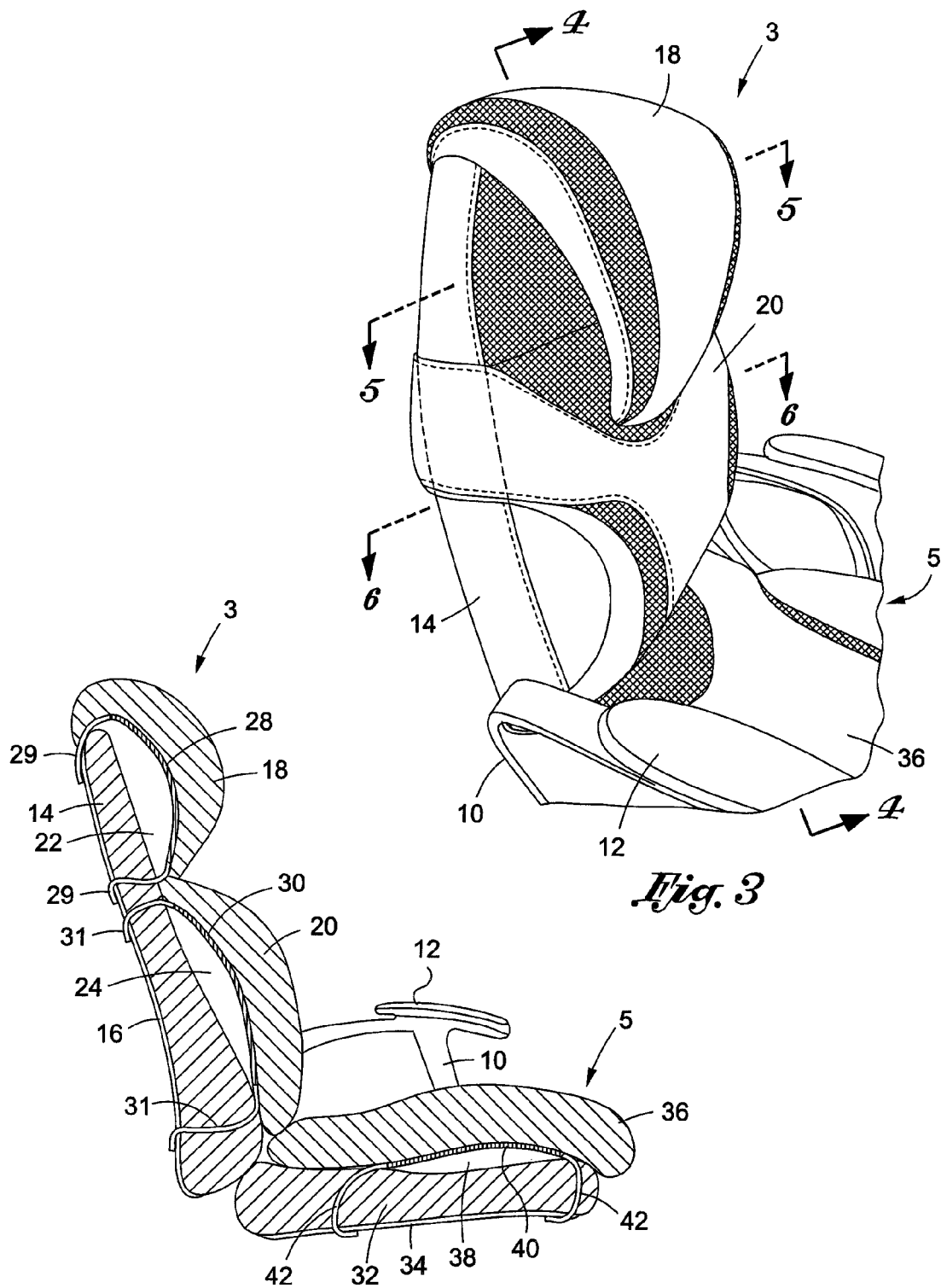

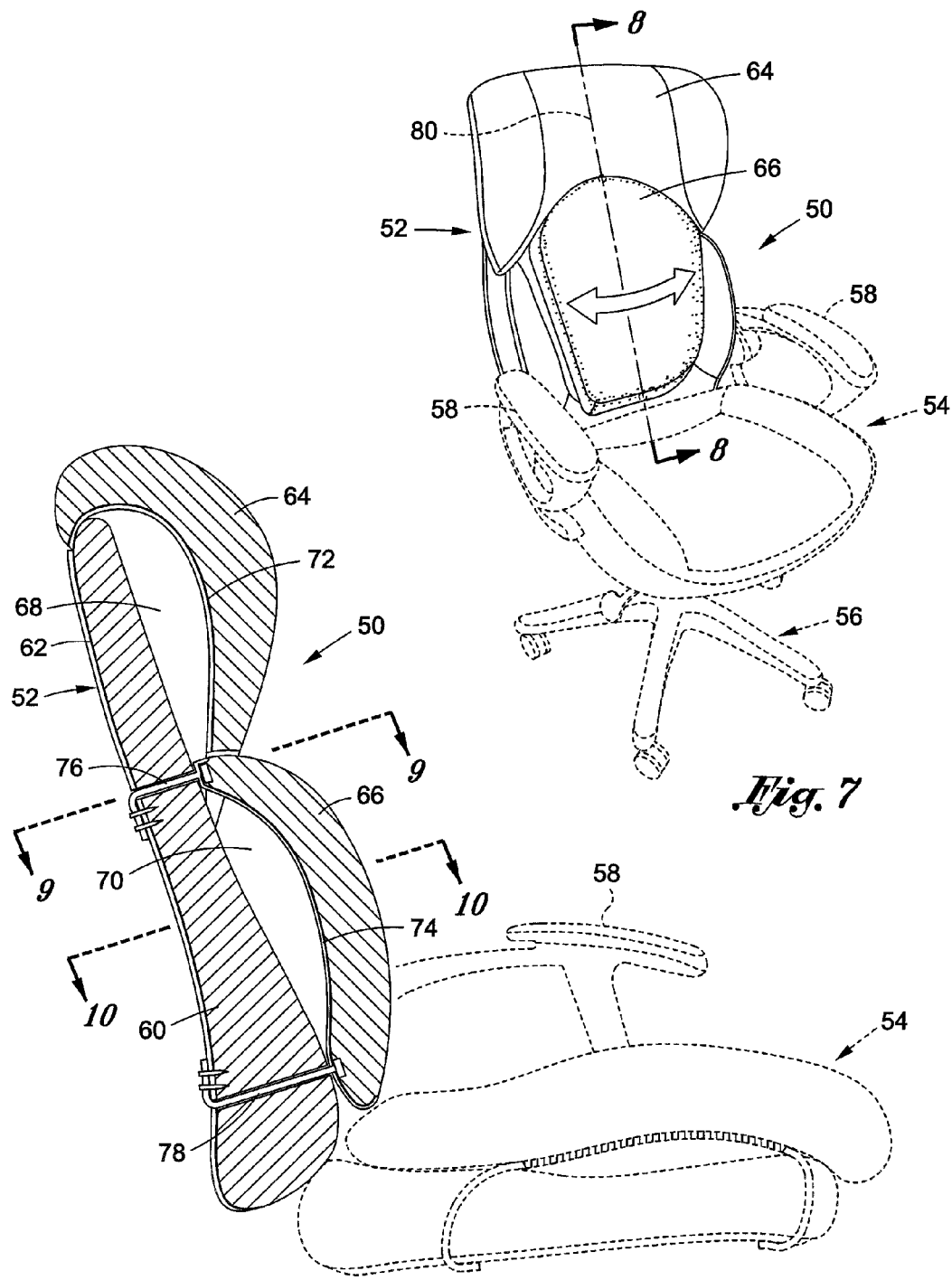

CHAIR HAVING A DYNAMICALLY-FLEXIBLE BACK AND SEAT

CROSS REFERENCE TO RELATED APPLICATIONS

This application is a continuation-in-part of application Ser. No. 13/624,114 filed Sep. 21, 2012.

BACKGROUND OF THE INVENTION

1. Field of the Invention

This invention relates to a home or office chair including a dynamically-flexible back and seat having a shape that adjusts to the movements of a user seated in the chair. In one embodiment, the back and seat of the chair carry a resilient frame or liner that is adapted to flex in response to compressive forces generated as the user slides his body from side-to-side in the chair. In another embodiment, a lumbar portion of the chair back is rotatable back and forth around a vertical pivot axis as the user shifts his weight in the chair.

2. Background Art

Chairs of the kind commonly found in an office or at home have a back and seat to support the body of a user. To enhance the comfort of the user, the back and seat of the chair are often padded or provided with a cushion material. Despite this comfort feature, the back and seat of the usual home or office chair have a relatively inflexible contour which is unable to change to conform to the shape of the user's body should he turn or move from side-to-side in the chair. That is to say, the user is likely to encounter a generally stiff chair back and seat when his initial at-rest centered position changes. This disadvantage can lead to user discomfort if the user slides along the chair.

Accordingly, what is desirable is an improved chair having a dynamically-flexible back and seat to overcome the aforementioned disadvantage, such that the shape of back and seat changes in response to compressive forces generated as the user slides his body back or from side-to-side in the chair.

SUMMARY OF THE INVENTION

Briefly, and in general terms, a home or office chair is disclosed having a dynamically-flexible back and seat to enhance the comfort of one seated in the chair as his position in the chair changes. The chair back includes an upstanding, generally vertical back support. A head rest portion to support a user's head and a lumbar portion to support the user's lower back are disposed one above the other and attached to the back support of the chair back. The head rest and lumbar portions have an arcuate (i.e., arched) configuration, such that an air gap is established between each of the head rest and lumbar portions and the opposing back support. The seat of the chair includes a generally horizontal seat support that extends outwardly from the chair back. An arcuate (i.e., arched) seat cushion to support the user's thighs and torso is spaced above and attached to the seat support, such an air gap is established between the seat cushion and the opposing seat support.

In accordance with a first preferred embodiment, each of the head rest and lumbar portions of the chair back and the seat cushion of the chair seat carries a flexible frame or liner which is manufactured from a resilient material having a spring memory. The head rest and lumbar portions are tied to the back support, such that the flexible liners lie in opposite facing alignment with the back support. The seat cushion is tied to the seat support, such that the flexible liner thereof lies in opposite facing alignment with the seat support.

Each of the flexible liners carried by the head rest portion and the lumbar portion of the chair back and by the seat cushion of the chair seat is adapted to bend in response to compressive forces generated by the user shifting his body back or from side-to-side. By virtue of the foregoing, the head rest portion, lumbar portion and seat cushion move towards the back support and the seat support and into respective air gaps such that the shapes adjust to conform to the shape of the user's body and thereby maximize user comfort. Because of the spring characteristic thereof, the flexible liners will expand, and the head rest portion, lumbar portion and seat cushion of the chair will automatically return to their initial centered position and arcuate shape when the user is at rest or no longer seated in the chair.

In accordance with a second preferred embodiment, the lumbar portion of the chair back carries a flexible liner having a spring memory. The lumbar portion is located in opposite facing alignment with the back support of the chair such that a gap is established therebetween. The top of the lumbar portion is attached to the back support by a first (e.g., plastic) tie, and the bottom of the lumbar portion is attached to the back support by a second (e.g., plastic) tie. The first and second ties are connected behind the chair back by staples, or the like. The first and second ties are located one above the other so as to create a vertical pivot axis around which the lumbar portion can rotate as the user shifts his weight against the chair back. In particular, the lumbar portion is rotatable back and forth (i.e., from side-to-side) relative to and independently of the back support of the chair so as to tilt into the gap and thereby enhance the user's comfort as he changes his position within the chair.

BRIEF DESCRIPTION OF THE DRAWINGS

FIG. 3 is a partial perspective view showing details of the back and seat of the chair of FIG. 1;

FIG. 4 is a cross-section taken along lines 4-4 of FIG. 3;

FIG. 7 is a perspective view of a chair having a dynamically-flexible back and seat according to a second preferred embodiment of this invention;

FIG. 8 is a cross-section of the chair taken along lines 8-8 of FIG. 7;

DESCRIPTION OF THE PREFERRED EMBODIMENT

Details for a chair 1 having a dynamically-flexible back and seat according to a first preferred embodiment of this invention are disclosed while referring concurrently to FIGS. 1-6 of the drawings. The chair 1 is of the type that would be commonly found in a home or office. However, the dynamically-flexible back and seat of this invention may also be used with a variety of different chairs. As will be described in greater detail hereinafter, the chair 1 provides improved user comfort by means of having a shape which is adjustable in response to the movements of a seated individual. At the same time, the chair 1 is constructed to promote air flow, heat dissipation and cooling to further enhance the comfort of the user.

Figures 1, 2:
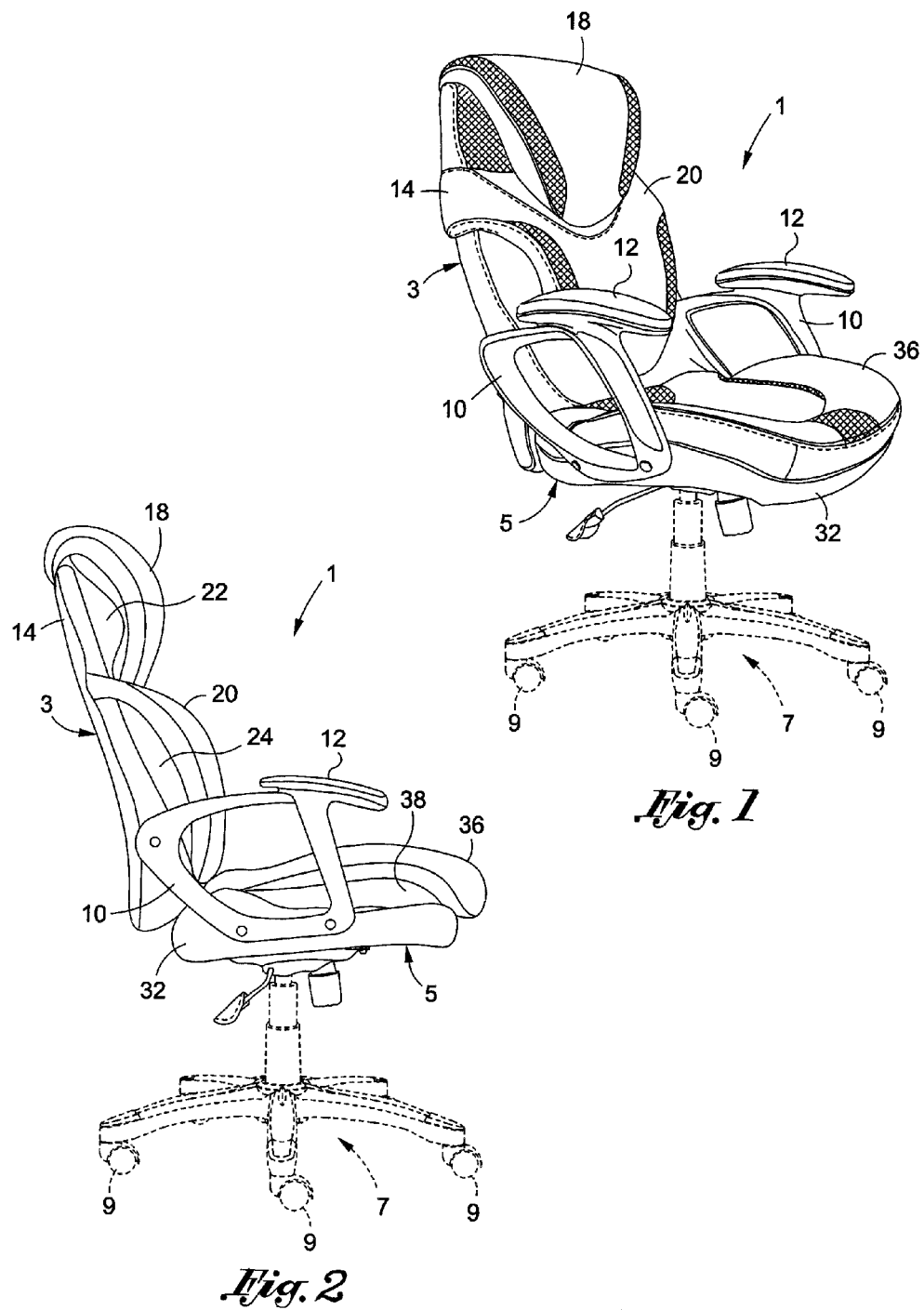
FIG. 1 is a perspective view of a chair having a dynamically-flexible back and seat according to a first preferred embodiment of this invention.
FIG. 2 is a side view of the chair of FIG. 1.

As is best shown in FIGS. 1 and 2, the chair 1 includes a back 3 against which the user's back is rested, a seat 5 to support the weight of the user, and an adjustable base 7 to hold the back 3 and seat 5 off the ground. The base 7 (shown in broken lines) includes a set of rollers 9 to enable the chair 1 to be moved from place-to-place. However, the advantages of this invention are applicable to chairs with a base other than that shown in FIGS. 1 and 2, including chairs with legs or with no base at all. Thus, the base 7 of the chair 1 shown in FIGS. 1 and 2 is not to be regarded as a limitation of this invention.

A pair of arms 10 are located at opposite sides of the chair 1. Each arm 10 is connected between the back 3 and the seat 5 of chair 1. A cushion arm rest 12 is mounted atop each of the arms 10 to receive and support the arms of the user. Like the base 7, the particular arms of the chair 1 and the manner in which the arms are connected to the chair 1 should not be regarded as a limitation of this invention.

Referring to FIGS. 3-6 of the drawings, details are now provided of the back 3 and seat 5 of the chair 1 and the improved comfort features which are characteristic thereof. The back 3 includes a back support 14 which stands upwardly and generally vertically from the seat 5. The back support 14 is typically manufactured from a firm material that is affixed (e.g., adhesively bonded) to a relatively rigid backing 16 manufactured from plywood or the like.

Figure 5:
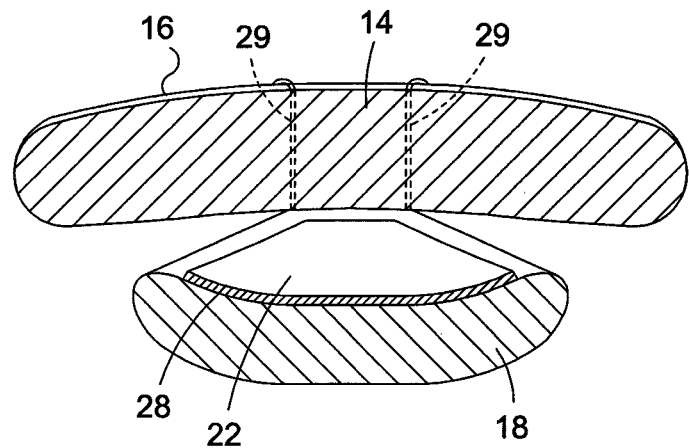
FIG. 5 is a cross-section taken along lines 5-5 of FIG. 3.
Figure 6:
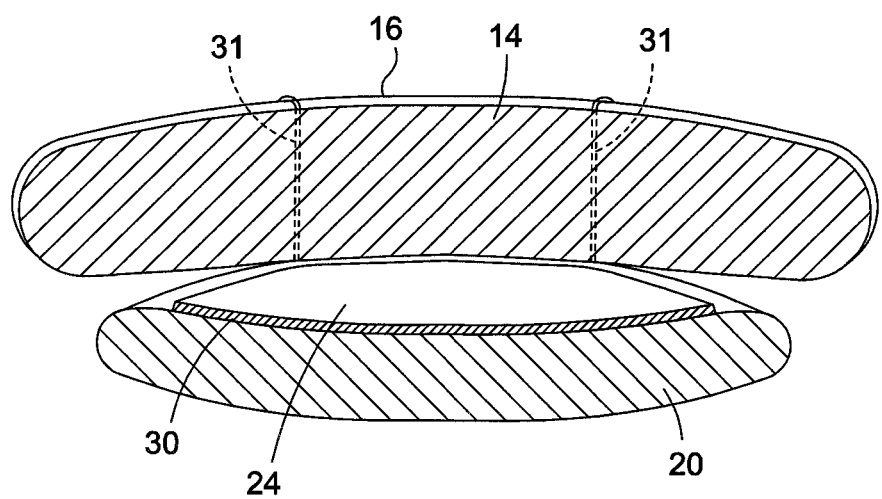
FIG. 6 is a cross-section taken along lines 6-6 of FIG. 3.

The back 3 of the chair 1 also includes a head rest portion 18 to receive the user's head thereagainst and a lumbar portion 20 against which the user's lower back is positioned. Each of the head rest and lumbar portions 18 and 20 is preferably manufactured from a comfortable cushion (e.g., foam) material. The head rest and lumbar portions 18 and 20 are positioned one above the other and attached to the back support 14 of the back 3 of the chair 1. That is, and as is best shown in FIG. 5, the head rest portion 18 is held against the back support 14 by means of (e.g., plastic) ties 29 which extend from the head rest portion 18, through the back support 14, to the backing 16 of the back support 14. As is best shown in FIG. 6, the lumbar portion 20 is held against the back support 14 by means of similar ties 31 which extend from the lumbar portion 20, through the back support 14, to the backing 16 of the back support 14.

The head rest and lumbar portions 18 and 20 have a generally arcuate or similar arched shape such that a first air gap 22 is created between the head rest portion 18 and the opposing back support 14, and a second air gap 24 is created between the lumbar portion 20 and the opposing back support 14.

As an important feature of the present invention, the back 3 of the chair 1 is adapted to change its original, at-rest shape in response to the movements of the user. To this end, a first flexible frame or liner 28 is carried by (e.g., glued to) the head rest portion 18 so as to lie in opposite facing alignment with the back support 14. As is also shown in FIGS. 5 and 6, the first air gap 22 is located between the back support 14 and the flexible liner 28 carried by the head rest portion 18. A second flexible frame or liner 30 is carried by (e.g., glued to) the lumbar portion 20 so as to also lie in opposite facing alignment with the back support 14. Thus, the second air gap 24 is located between the back support 14 and the flexible liner 30 carried by the lumbar portion 20. By way of example only, the first and second flexible liners 28 and 30 of the head rest and lumbar portions 18 and 20 of the back 3 of chair 1 are ideally manufactured from a resilient mesh or metal wire which has a characteristic spring memory. It may be appreciated that the first and second flexible liners 28 and 30 are held in front of the back support 14 so as to receive and be responsive to compressive forces applied to the head rest and lumbar portions 18 and 20 as the user changes the position of his back against the back 3 of the chair 1.

The seat 5 of the chair includes a seat support 32 which extends outwardly and generally horizontally from the upstanding seat 3. The seat support 32 is typically manufactured from a firm material that is affixed to a relatively rigid backing 34. The seat 5 also includes a seat cushion 36 that lays over top and is securely tied the seat support 32 to receive the user's thighs and torso thereagainst. The seat cushion 36 is preferably manufactured from a comfortable cushion material. The seat cushion 36 has a generally arcuate or similar arched shape such that a third air gap 38 is created between the seat support 32 and the opposing seat cushion 36.

As another important feature of this invention, the seat 5 of the chair 1 is adapted to change its original, at-rest shape in response to the movements of the user. More particularly, a third flexible frame or liner 40 is carried by (e.g., glued to) the seat cushion 36 so as to lie in opposite facing alignment with the seat support 32. Thus, the third air gap 38 is located between the seat support 32 and the seat cushion 36. The third flexible liner 40 of the seat cushion 36 is ideally manufactured from a resilient mesh or metal wire which has a characteristic spring memory. It may be appreciated that the third flexible liner 40 is held above the seat support 32 so as to receive and be responsive to compressive forces applied to the seat cushion 36 as the user shifts his weight along the seat 5 of the chair 1.

By virtue of the resilient nature of the first, second and third flexible liners 28, 30 and 40, the original, at-rest arcuate shapes of one or more of the head rest portion 18, the lumbar portion 20, and the seat cushion 36 of the back and seat 3 and 5 can change to provide the user with enhanced comfort and support as he shifts his body and his weight within the chair 1. More particularly, the flexible liners 28, 30 and 40 will be stressed and bend in response to compressive forces that are generated when the user presses his body against or slides from side-to-side over the head rest portion 18 and the lumbar portion 20 of the chair back 3 and the seat cushion 36 of the chair seat 5. Rather than providing a firm resistance to the user's movements as in the case of a conventional chair, the flexible liners 28, 30 and 40 enable the head rest portion 18, lumbar portion 20 and seat cushion 36 to be compliant and thereby change their shape depending upon the position of user's body and how much force is exerted on the back and seat 3 and 5 of the chair 1.

In particular, the flexible liners 28 and 30 are adapted to flex and store energy, such that the head rest portion 18 and the lumbar portion 20 of the chair back 3 will correspondingly move towards the opposing back support 14 and into the air gaps 22 and 24. Hence, the size of the air gaps 22 and 24 is reduced to absorb the force generated by the user's body. At the same time, the flexible liner 40 is adapted to flex and store energy, such that the seat cushion 36 will correspondingly move towards the opposing seat support 32 and into the air gap 38, whereby the size of the air gap 38 is also reduced. Because of the resilient nature and spring-like memory of the flexible liners 28, 30 and 40, the liners will release their stored energy and expand to their initial pre-stressed condition whenever the user exits the chair 1. In this same regard, the head rest portion 18, lumbar portion 20 and seat cushion 36 of the chair back and seat 3 and 5 will automatically move out of the respective air gaps 22, 24 and 38 and return to their original at-rest centered position and arcuate shape.

The air gaps 22, 24 and 38 provide the chair 1 with the additional advantage of air flow paths which extend laterally through the chair back and seat 3 and 5. The air flow paths facilitate the dissipation of heat and promote cooling to make the chair more comfortable for the user.

Another chair 50 having a dynamic back and seat is disclosed while referring concurrently to FIGS. 7-12 of the drawings. Like the chair 1 that was described when referring to FIGS. 1-6, the chair 50 of FIGS. 7-12 provides improved user comfort by means of having a shape which is adjustable in response to the movements of a seated individual. Also like the chair 1 of FIGS. 1-6, the chair 50 includes a dynamic back 52 against which the user's back is rested, a dynamic seat 54 to support the weight of the user, and an adjustable base 56 (best shown in FIG. 7) to hold the back 52 and seat 54 off the ground. A pair of arms 58 (also best shown in FIG. 7) are connected at opposite sides of the chair 50 between the back 52 and the seat 54 thereof.

The dynamic seat 54, base 56 and arms 58 of the chair 50 shown in FIGS. 7-12 may be identical to the dynamic seat 5, base 7 and arms 10 from the chair 1 shown in FIGS. 1-6. Therefore, the seat 54, base 56 and arms 58 of chair 50 have been shown in broken lines and will not be described again. Moreover, it is to be understood that the soon-to-be disclosed advantages of the chair 50 are also applicable to other chairs having one or more seats, bases and arms other than those illustrated in FIGS. 7-12.

Details are now provided of the dynamic back 52 of the chair 50 while continuing to refer to FIGS. 7-12. The chair back 52 includes a back support 60 which stands upwardly and generally vertically from the chair seat 54. The back support 60 is typically manufactured from a first material that is affixed (e.g., adhesively bonded) to a relatively rigid backing 62 that is commonly manufactured from plywood or the like.

The chair back 52 also includes a head rest portion 64 to receive the user's head thereagainst and a lumbar portion 66 against which the user's lower back is positioned. Each of the head rest and lumbar portions 64 and 66 is preferably manufactured from a comfortable foam material and attached one above the other to the back 52. The head rest and lumbar portions 64 and 66 have a generally arcuate or similarly arched shape such that a first air gap 68 is created between the head rest portion 64 and the opposing back support 60, and a second air gap 70 is created between the lumbar portion 66 and the opposing back support 60.

A first flexible liner 72 having a spring memory is attached (e.g., glued) to the head rest portion 64 so as to lie in opposite facing alignment with the back support 60. The head rest portion 64 is secured to the top of the back support 60 so as to lie above the lumbar portion 66. A second flexible liner 74 having a spring memory is attached (e.g., glued) to the lumbar portion 66 so as to also lie in opposite facing alignment with the back support 60. Each of the flexible first and second liners 72 and 74 initially has an arcuate (i.e., curved) shape which conforms to the shape of the arcuate head rest and lumbar portions 64 and 66.

As an important feature of the chair 50 that is shown in FIGS. 7-12, the lumbar portion 66 of the chair back 52 is adapted to change its original, at-rest position as is best shown in FIG. 8 in response to the movements of the user. In particular, and as also best shown in FIG. 8, the top of the lumbar portion 66 is attached to the back support 60 by a first (e.g., plastic) tie 76. The bottom of the lumbar portion 66 is attached to the back support 60 by a second (e.g., plastic) tie 78. Each of the pair of ties 76 and 78 extends from a first end thereof through the flexible liner 74 of lumbar portion 66 to an opposite end which lies behind the backing 62 of the back support 60. The opposite ends of the ties 76 and 78 are secured to the back support 60 by mans of staples or the like.

Figure 9:
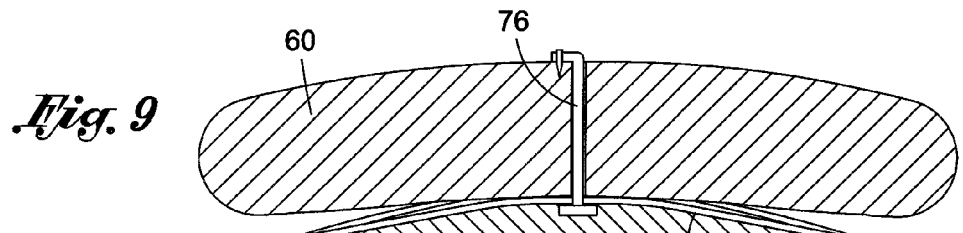
FIG. 9 is a cross-section of the chair back taken along lines 9-9 of FIG. 8.
Figure 10:
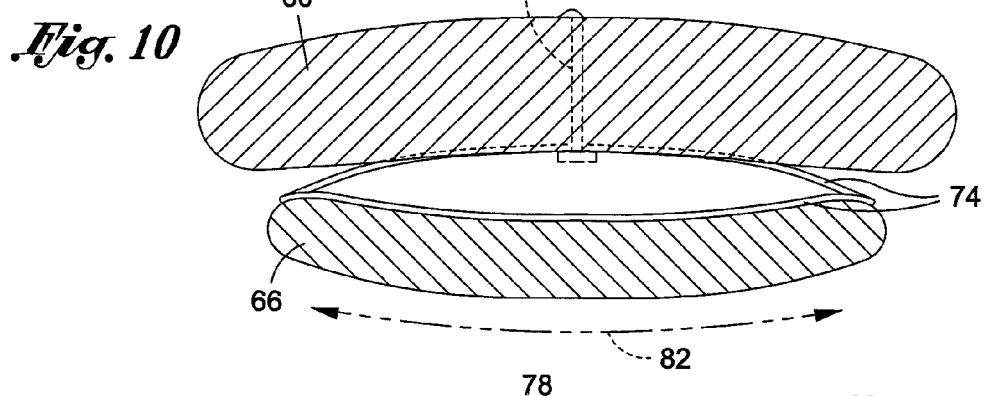
FIG. 10 is a cross-section of the chair back taken along lines 10-10 of FIG. 8.

It is important that the first and second ties 76 and 78 be located one directly above so as to create the end points of a vertical pivot axis (designated 80 in FIG. 1) around which the lumbar portion 66 can rotate as the user shifts his weight against the chair back 52. That is, the vertical pivot axis 80 runs between the pair of ties 76 and 78 from the top of the lumbar portion 66 to the bottom thereof. FIG. 9 shows the lumbar portion 66 of the chair back 52 at rest when the user is sitting still in the chair 50 or has left the chair. FIG. 10 illustrates the dynamic nature of the lumbar portion 66 and its ability to rotate back and forth (i.e., from side-to-side in the manner illustrated by the directional arrows 82) relative to and independently of the back support 60 to enhance the user's comfort as he changes his position within the chair.

Figure 11:
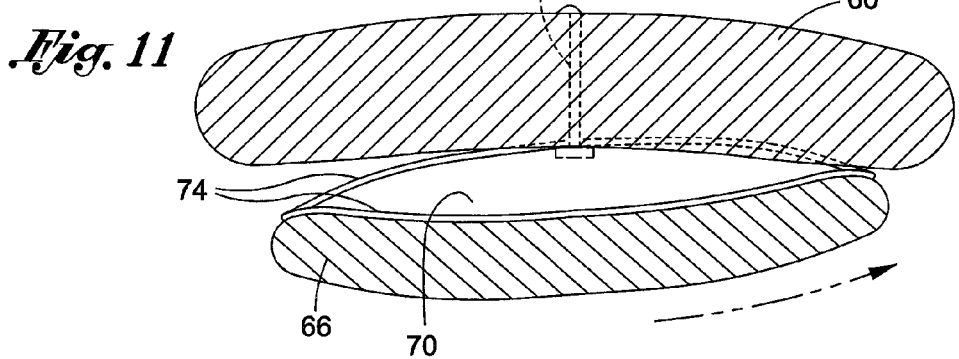
FIG. 11 shows a lumbar portion of the chair back rotated around a vertical pivot axis in a first direction.
Figure 12:
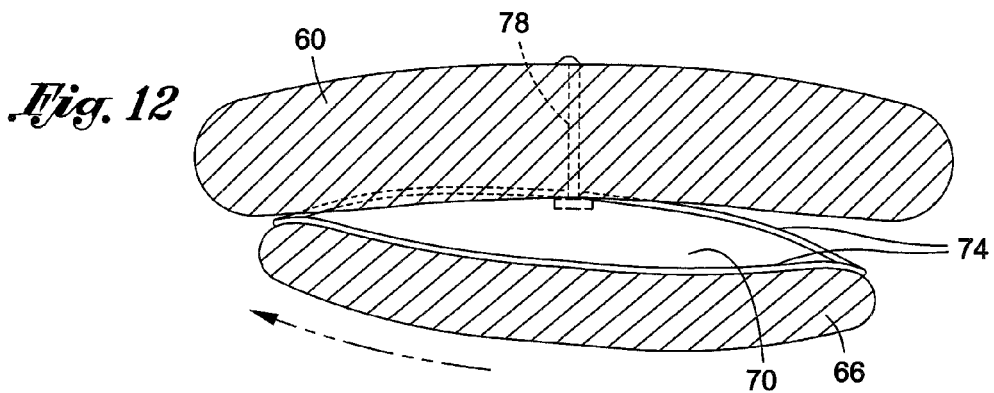
FIG. 12 shows the lumbar portion of the chair back rotated around the vertical pivot axis in an opposite direction.

In the example of FIG. 11, the user shifts his weight to one side of the chair back 52. Accordingly, the lumbar portion 66 correspondingly rotates with the user in a first direction around the vertical pivot axis between the pair of ties 76 and 78 so as to move into the air gap 70 and tilt towards one side of the back support 60. In the example of FIG. 12, the user shifts his weight to the opposite side of the chair back 52. In this case, the lumbar portion 66 correspondingly rotates in an opposite direction around the vertical pivot axis between the pair of ties 76 and 78 so as to move into the air gap 70 and tilt towards the opposite side of the back support 60.

At the same time that the lumbar portion 66 rotates around the pivot axis and tilts towards one side of the back support 60 or the other side, the curved flexible liner 74 that is carried by the lumbar portion will also be bent (i.e., flattened) and compressed so as to move with the lumbar portion into the air gap 70 and thereby absorb the pressure generated when the user shifts his weight backwards in the chair. Accordingly, the user's back is fully enveloped by the lumbar portion 66 for maximum comfort by changing its shape in response to both linear (i.e., backwards) and rotational (i.e., side-to-side) compressive forces.

It may therefore be appreciated that rather than providing a uniformly firm resistance to the user's movements against the back of a conventional chair, the vertical pivot axis 80 established between the pair of ties 76 and 78 located at the top and bottom of the lumbar portion 66 enables the lumbar portion to respond (i.e., rotate) and the chair back 52 to change its shape depending upon the position of the user's back in the chair 50. The air gaps 68 and 70 provide the chair 50 with the additional advantage of air flow paths which extend laterally through the chair back 52. The air flow paths facilitate the dissipation of heat and promote cooling to make the chair more comfortable for the user.

The invention claimed is:

1. A chair comprising a back and a seat, said back including a back support having first and opposite sides and standing upwardly from said seat and a lumbar portion against which a user's back is positioned, said lumbar portion being connected to said back support by first and second attachments that are spaced from and located above one another so as to lie on a pivot axis that is established between said first and second attachments and that runs in the same direction as the direction its which the back support stands upwardly from the chair seat, said lumbar portion having a top, a bottom and a curved section lying between said top and said bottom and being spaced in front of said back support by a gap, said lumbar portion rotating back and forth around said pivot axis and tilting towards the first side of said back support or towards the opposite side thereof so that the curved section of said lumbar portion moves into said gap when the user shifts the position of his back against said lumbar portion.

2. The chair recited in claim 1, wherein said first attachment is a tie that is attached between the top of said lumbar portion and said back support, and said second attachment is a tie that is attached between the bottom of said lumbar portion and said back support.

3. The chair recited in claim 1, wherein said lumbar portion also has a curved flexible liner attached to the curved section of said lumbar portion and lying opposite the back support such that said curved flexible liner and said back support are separated from one another by said gap, the curved flexible liner being flattened and moving into said gap towards said back support at the same time that said lumbar portion rotates back and forth around said pivot axis and the curved section of said lumbar portion moves into said gap.

4. The chair recited in claim 1, wherein said pivot wound which said lumbar portion is rotatable runs in a substantially vertical direction along the upstanding back support of said chair back.

* * * * *